United States Patent
D'Alesio (10) Patent No.: US 9,801,483 B2
(45) Date of Patent: Oct. 31, 2017

(54) ADJUSTABLE BEVERAGE HOLDER

(71) Applicant: Binky Enterprises, LLC, Moon Township, PA (US)

(72) Inventor: Alene D'Alesio, Moon Township, PA (US)

(73) Assignee: Binky Enterprises, LLC, Moon Township, PA (US)

(*) Notice: Subject to any disclaimer, the term of this patent is extended or adjusted under 35 U.S.C. 154(b) by 33 days.

(21) Appl. No.: 14/289,272

(22) Filed: May 28, 2014

(65) Prior Publication Data

US 2015/0342382 A1     Dec. 3, 2015

(51) Int. Cl.
- *B65D 3/28* (2006.01)
- *A47G 23/02* (2006.01)
- *F16B 47/00* (2006.01)

(52) U.S. Cl.
CPC ..... *A47G 23/0225* (2013.01); *A47G 23/0216* (2013.01); *F16B 47/00* (2013.01); *A47G 2023/0283* (2013.01)

(58) Field of Classification Search
CPC ............ B65D 81/3879; B65D 81/3876; A47G 23/0316
See application file for complete search history.

(56) References Cited

U.S. PATENT DOCUMENTS

| | | | |
|---|---|---|---|
| 2,968,888 A * | 1/1961 | Borah | A47K 1/08 215/393 |
| 3,090,478 A | 5/1963 | Stanley | |
| 4,747,507 A * | 5/1988 | Fitzgerald | A47G 23/02 220/739 |
| 4,921,117 A | 5/1990 | Mucciarone | |
| 5,088,673 A * | 2/1992 | Chandler | B60N 3/103 215/386 |
| 5,135,195 A * | 8/1992 | Dane | B60N 3/103 248/310 |
| 5,152,709 A | 10/1992 | Johnson, III et al. | |
| 5,285,953 A * | 2/1994 | Smith | B60N 3/103 220/737 |
| 6,000,575 A | 12/1999 | LaCour et al. | |
| 6,123,220 A * | 9/2000 | Williams | A47G 23/03 220/630 |
| 6,318,689 B1 * | 11/2001 | Rodriguez | A47G 23/0225 248/205.5 |
| 6,571,976 B1 | 6/2003 | Sonnabend | |
| 6,588,621 B2 | 7/2003 | Shimazaki | |
| 6,796,670 B2 | 9/2004 | Winters et al. | |
| 6,832,615 B2 | 12/2004 | Hensel | |
| 6,960,040 B2 | 11/2005 | D'Alessio et al. | |

(Continued)

*Primary Examiner* — Jeffrey Allen
(74) *Attorney, Agent, or Firm* — Shumaker, Loop & Kendrick, LLP; Jeffrey B. Fabian (57) ABSTRACT

A beverage holder configured to accommodate drinking vessels of different sizes and that can be secured on a resting surface includes a hollow tubular body with an open end, a closed end opposite the open end, at least one projection along the inner surface of the hollow tubular body spaced from the closed end, and a removable insert configured to seat within the hollow tubular body against the at least one projection such that the removable insert is spaced from the closed end. The beverage holder may also include at least one suction cup extending from the exterior surface of the closed end.

13 Claims, 14 Drawing Sheets

(56) References Cited

U.S. PATENT DOCUMENTS

| | | | |
|---|---|---|---|
| D516,872 S * | 3/2006 | Rigberg | D7/619.1 |
| 7,036,700 B2 * | 5/2006 | Engel | B60N 3/106 |
| | | | 224/501 |
| 7,337,915 B1 | 3/2008 | Weldon | |
| 7,731,144 B2 | 6/2010 | Kazyaka | |
| 7,861,647 B2 | 1/2011 | So et al. | |
| 8,061,670 B1 * | 11/2011 | White | B60N 3/10 |
| | | | 248/309.1 |
| 8,272,523 B1 * | 9/2012 | DeMusis, Sr. | A47L 23/00 |
| | | | 215/393 |
| D678,731 S | 3/2013 | O'Neill | |
| D690,823 S | 10/2013 | D'Alesio | |
| 8,544,678 B1 | 10/2013 | Huges | |
| 8,592,014 B2 | 11/2013 | Alvarez et al. | |
| 8,870,044 B1 * | 10/2014 | Freese | F16B 2/12 |
| | | | 224/407 |
| 8,978,906 B2 * | 3/2015 | Feeley | A61J 9/06 |
| | | | 215/11.1 |
| 2004/0084461 A1 | 5/2004 | Eisenbraun et al. | |
| 2007/0012706 A1 * | 1/2007 | Deadman | B65D 81/3879 |
| | | | 220/737 |
| 2008/0011925 A1 | 1/2008 | Ruff et al. | |
| 2008/0190948 A1 | 8/2008 | Sayasithsena | |
| 2014/0042176 A1 | 2/2014 | Alvarez et al. | |

* cited by examiner

ADJUSTABLE BEVERAGE HOLDER

TECHNICAL FIELD AND BACKGROUND

The present invention relates generally to the field of beverage holders, and more particularly, to an adjustable beverage holder configured to accommodate drinking vessels of different sizes and that can be secured on a surface.

People consume beverages from drinking vessels of different sizes, shapes, and configurations. When a person is not consuming a beverage, the person typically sets the drinking vessel down on a counter, table top, dashboard, or other resting surface. Unfortunately, the physical dimensions of a drinking vessel often make it prone to overturning or spilling when it is inadvertently jostled or mishandled. This is especially true for particularly tall or narrow drinking vessels that are more prone to overturning. It would, therefore, be advantageous to provide a beverage holder that can be adapted to fit drinking vessels of various sizes and that can be secured on a resting surface to prevent undesirable movement and spilling.

Accordingly, it is an object of the present invention to provide a stable, adjustable beverage holder that can be releasably secured on a resting surface and that can accommodate drinking vessels of various sizes using one or more projections or ridges to support a removable insert.

SUMMARY

According to one embodiment of the invention, a beverage holder includes: a hollow tubular body with an open end; a closed end opposite the open end; and at least one suction cup extending from the exterior surface of the closed end. The beverage holder also includes at least one projection arranged along an inner surface of the hollow tubular body and spaced a distance from the closed end; and a removable insert configured to seat within the hollow tubular body against the at least one projection such that the removable insert is spaced from the closed end.

In another embodiment, the removable insert is a planar disc that is aligned transverse to a vertical axis of the hollow tubular body when seated within the hollow tubular body. The removable insert can optionally include a passage.

In yet another aspect of the invention, the hollow tubular body tapers in the direction of the closed end. The hollow tubular body can optionally be made from an insulating material.

Another embodiment of the invention utilizes a plurality of projections arranged periodically around the inner circumference of the hollow tubular body. In another embodiment, the projection is a continuous annular bead extending radially inward from the inner surface of the hollow tubular body. The projection can optionally be formed from a resilient elastomeric material.

Other embodiments of the beverage holder include a plurality of suction cups arranged periodically along the exterior surface of the closed end. In another aspect of the invention, the beverage holder includes at least one suction cup attached to an exterior surface of the hollow tubular body other than the closed end.

A further aspect of the invention is an aperture extending through the closed end. The hollow tubular body can optionally include at least one notch for receiving a handle of a drinking vessel or one or more contours for receiving fingers of a user.

According to another embodiment of the invention, a beverage holder includes: a hollow tubular body having a closed end; an open end opposite the closed end; and a ridge on an inner surface of the hollow tubular body spaced a distance from the closed end. The beverage holder also includes a removable insert configured to seat within the hollow tubular body against the ridge such that the removable insert is spaced from the closed end. In another aspect of the invention, the beverage holder further includes at least one suction cup extending from an exterior surface of the closed end, or a nonslip surface at least partially covering the exterior surface of the closed end.

According to further embodiment of the invention, a beverage holder includes: a hollow tubular body having a closed end; an open end opposite the closed end; and at least one projection arranged on an inner surface of the hollow tubular body and spaced a distance from the closed end.

BRIEF DESCRIPTION OF THE DRAWINGS

Features, aspects, and advantages of the present invention are better understood when the following detailed description of the invention is read with reference to the accompanying figures, in which.

DETAILED DESCRIPTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete and will fully convey the scope of the invention and enable one of ordinary skill in the art to make, use, and practice the invention.

Disclosed herein is a beverage holder apparatus for releasably securing drinking vessels of various sizes to a surface. Although the embodiments disclosed herein find particular application in securing drinking vessels to a surface, one of ordinary skill in the art will appreciate that the apparatus can be used to secure vessels or containers generally.

As used herein, the term drinking vessel generally denotes any container configured to hold liquid or other contents. The term drinking vessel is used interchangeably with the terms beverage container and beverage enclosure. The term tubular is intended to generally describe a hollow, elongated body of any cross sectional shape, including circular, squared, rectangular, or the like. The term user describes an individual who utilizes the beverage holder apparatus of the present invention to secure a vessel or container on a resting surface, and the term is used interchangeably with the terms consumer, person, or individual. Wherever used herein, the masculine shall be deemed to include the feminine, and the feminine shall be deemed to include the masculine.

A beverage holder 100 according to one embodiment of the invention generally includes a hollow tubular body 30 having a vertically aligned interior cavity 7, a closed end 2, and an open end 6 opposite the closed end 2. The hollow tubular body 30 may be integrally formed or include separate closed end 2 and sidewall 4 portions. The open end 6 provides access to a vertically aligned, interior cavity 7 dimensioned to receive a drinking vessel 14. The tubular body 30 has a height sufficient to prevent spillage and keep a drinking vessel 14 in the upright position when placed inside the beverage holder 100. The beverage holder 100 further includes one or more projections 8 or a ledge 9 on the interior surface of the cavity 7. The projections 8 or ledge 9 are configured to support a removable insert 16 to change the height of the beverage holder 100.

Figure 1A:
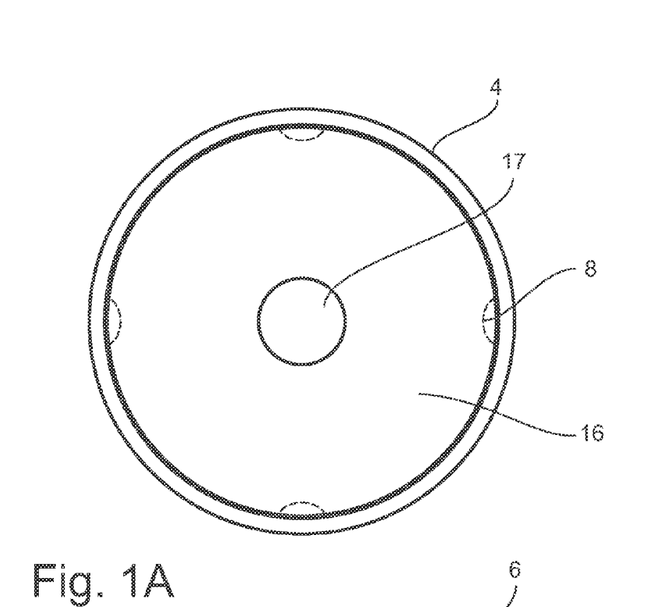
FIG. 1a is a top view of a beverage holder according to a first embodiment of the invention.
Figure 1B:
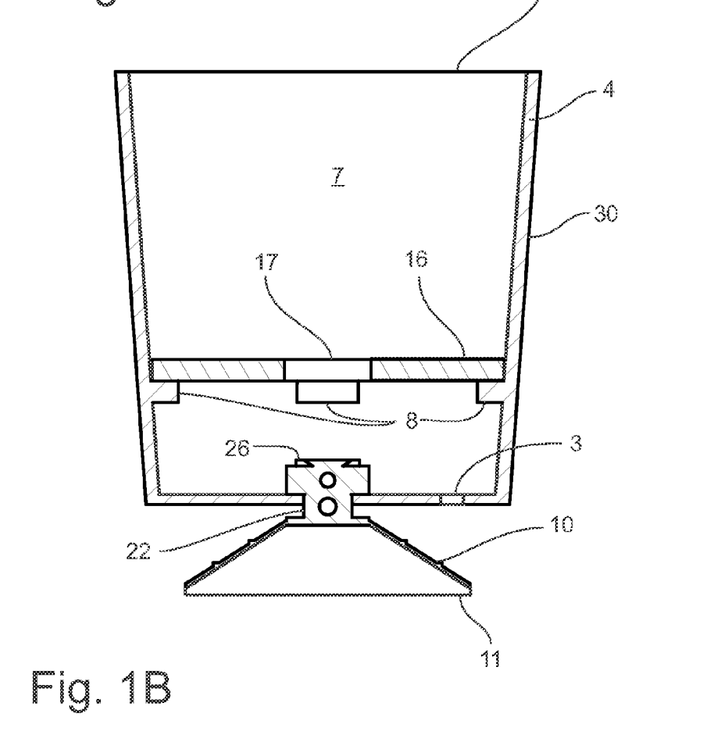
FIG. 1b is a cutaway, side view of a beverage holder according to a first embodiment.
Figure 1C:
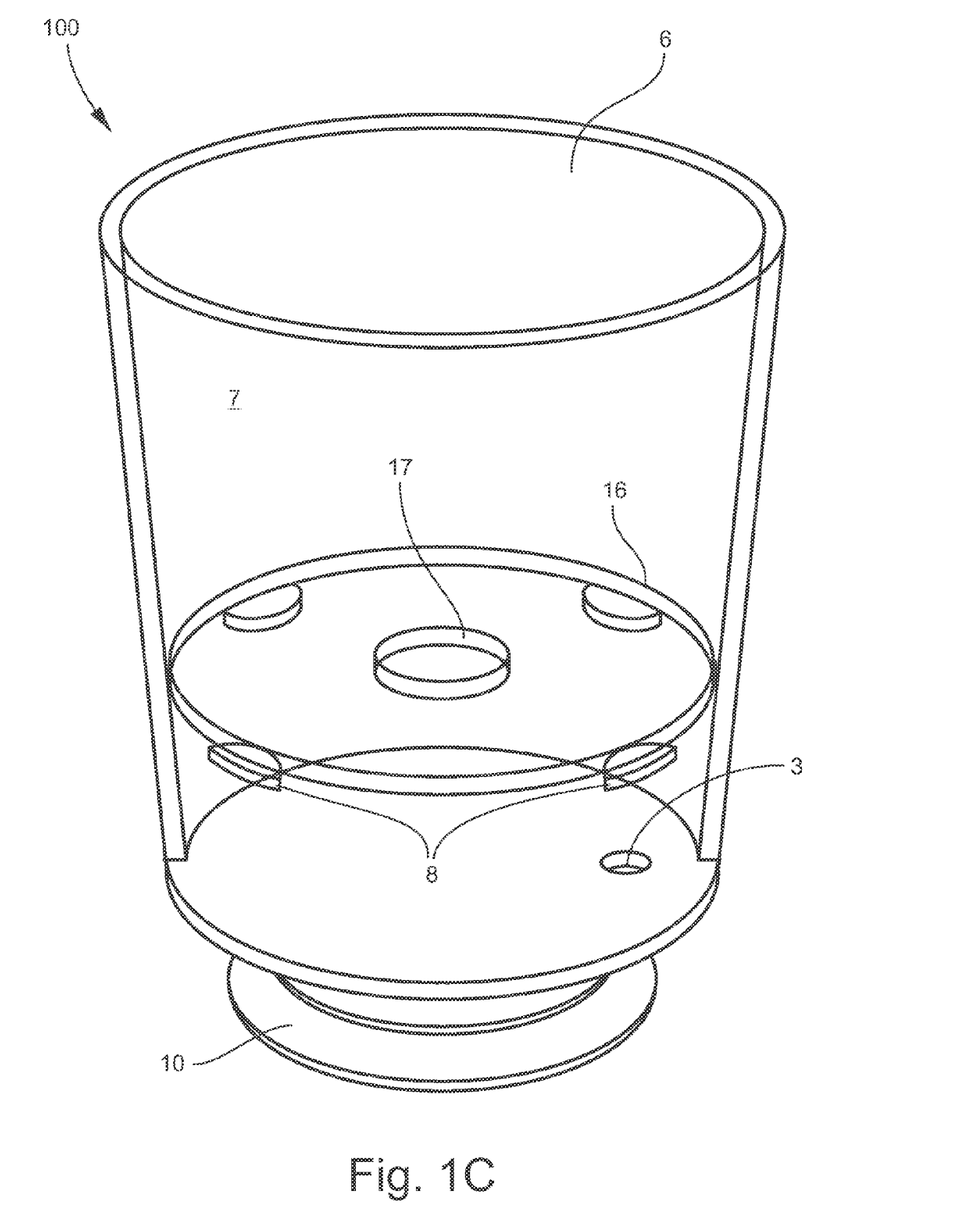
FIG. 1c is a transparent, perspective view according to a first embodiment.
Figure 2A:
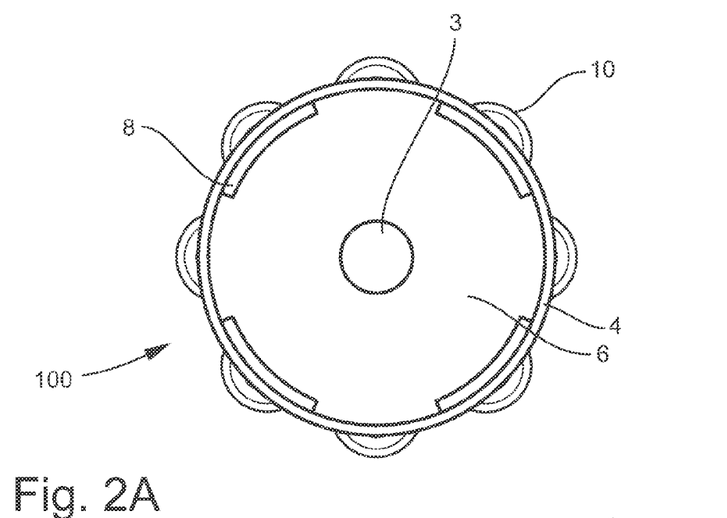
FIG. 2a is a top view of a beverage holder according to a second embodiment of the invention.
Figure 2B:
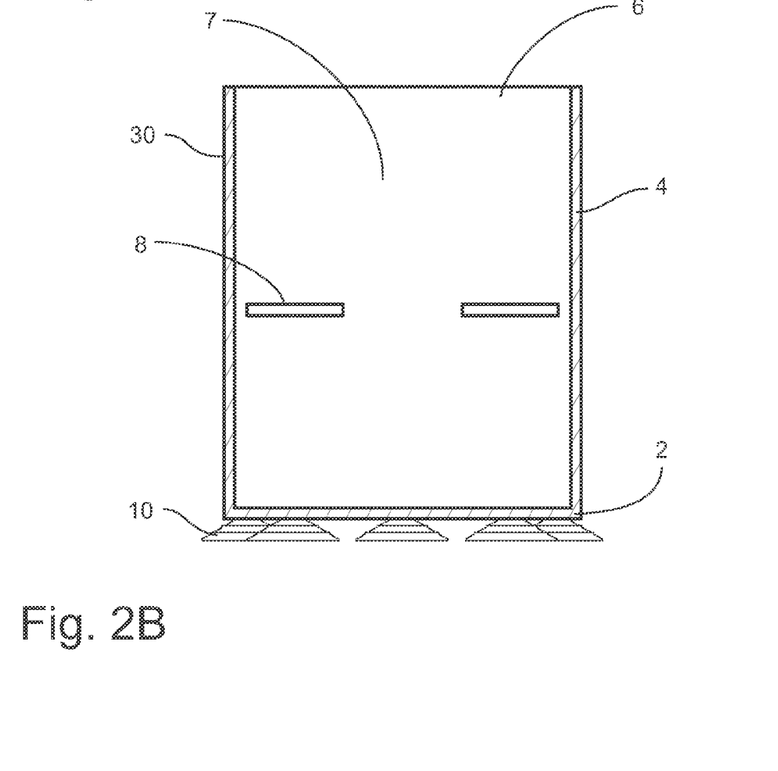
FIG. 2b is a cutaway, side view of a beverage holder according to a second embodiment.
Figure 2C:
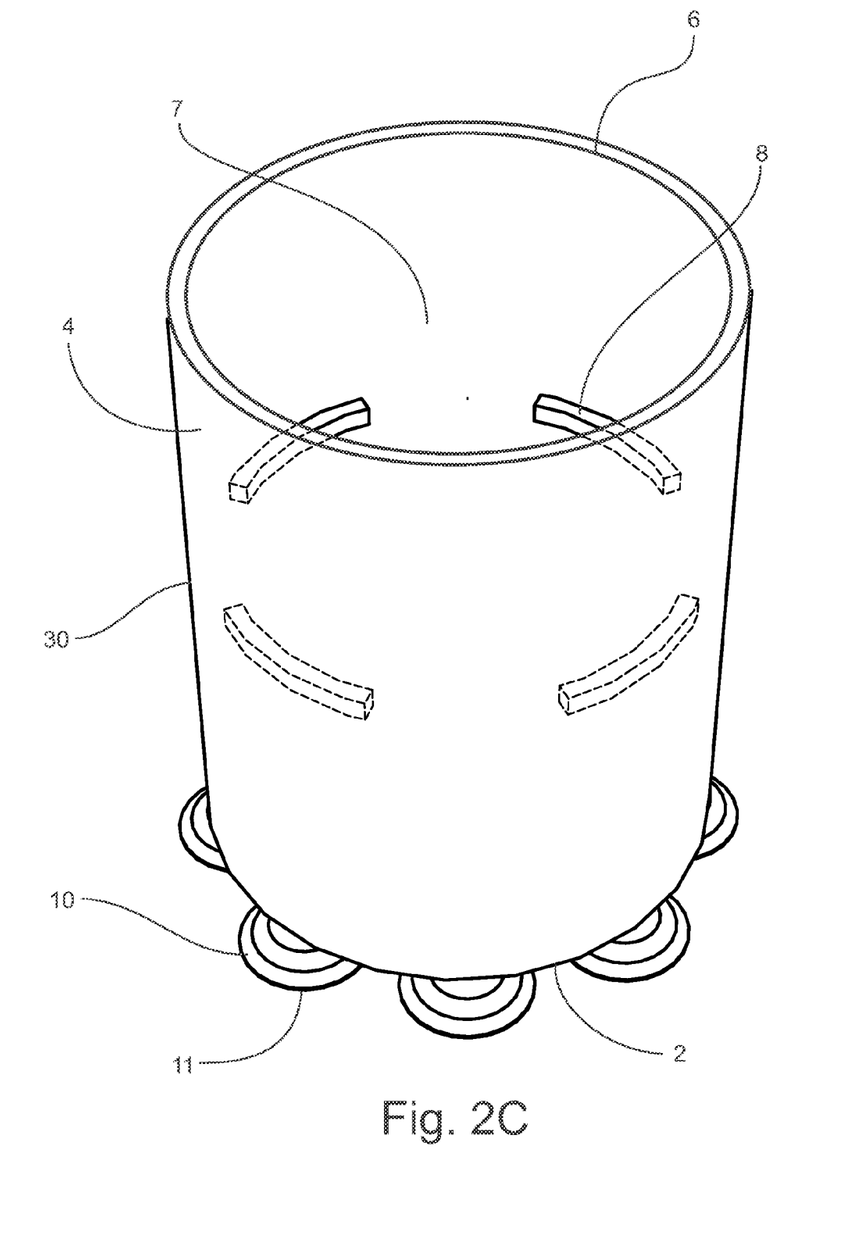
FIG. 2c is a transparent, perspective view according to a second embodiment.
Figure 3:
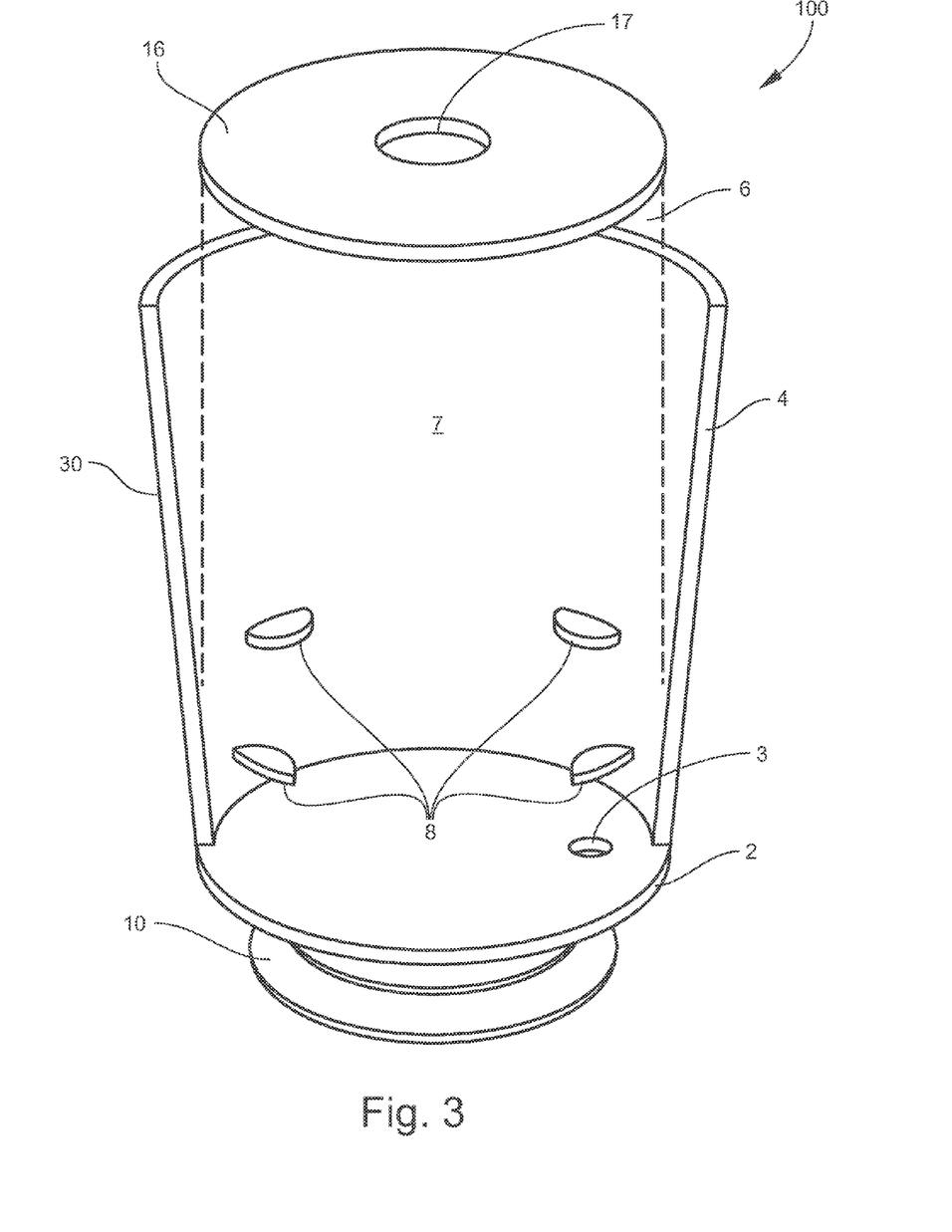
FIG. 3 is an exploded view illustrating installation of the removable insert.
Figure 4:
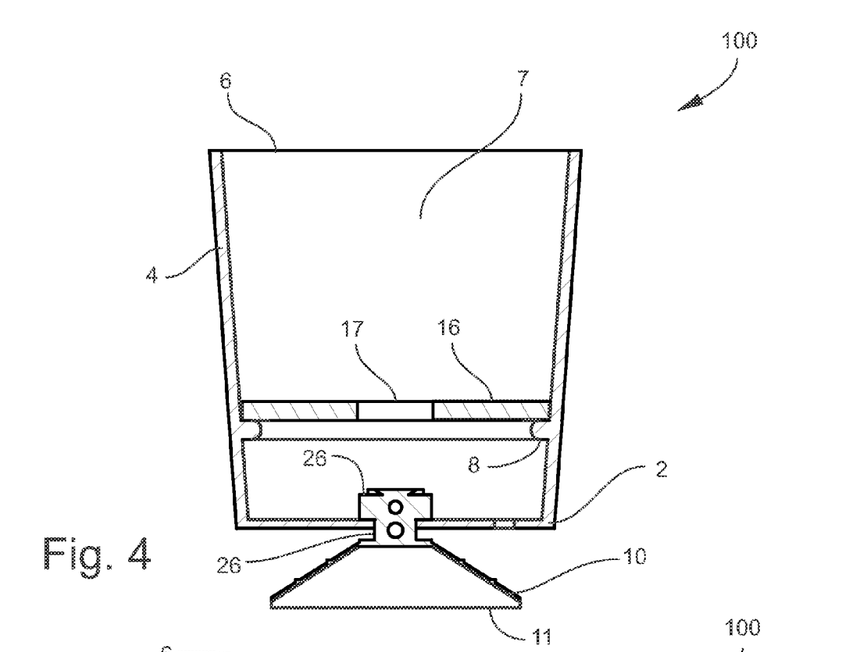
FIG. 4 is a transparent, side view according to an embodiment of the invention.
Figure 5:
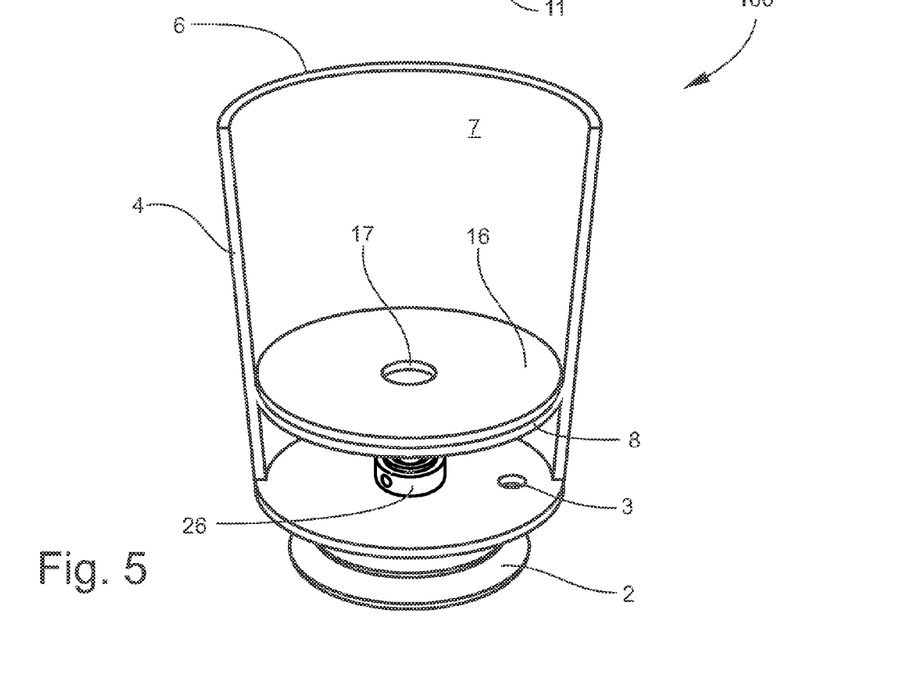
FIG. 5 is a transparent, perspective view according to an embodiment of the invention.

The exemplary embodiments shown in FIG. 2 includes eight suction cups 10 that are circumferentially arranged and evenly spaced around the exterior surface of the closed end 2. The use of multiple suction cups 10 facilitates attachment of the beverage holder 100 to resting surfaces that have irregularities or smaller surface areas. The circumferential arrangement of the suction cups 10 allows for the formation of a central aperture 3 in the closed end 2 that permits drainage of condensation or spilled liquid. The aperture 3 also helps to avoid creating a vacuum effect that inhibits insertion or removal of a drinking vessel 14. The aperture 3 does not need to be centrally located on the closed end 2. In embodiments with a single, centrally located suction cup 10, the aperture 3 can be formed at any suitable location on the closed end 2, as illustrated in FIGS. 1, 3, and 5.

One of ordinary skill in the art will recognize that any number of suction cups 10 can be used, and the suction cups 10 can be arranged in any suitable configuration. The suction cups 10 can be affixed to, or integrally formed on, a surface of the closed end 2. Moreover, one or more suction cups 10 can also be affixed to other surfaces of the beverage holder 100, such as the outer surface of a sidewall 4. This configuration allows the beverage holder 100 to be secured to a wall or other vertical surface when it is not being used.

The one or more suction cups 10 are generally circular with a smooth, concave working surface 11. The suction cups 10 are preferably made of a resilient or elastic material capable of recovering its size and shape after deformation. The material should be resilient enough to change shape and create a seal but rigid enough to support the required loads (i.e., releasably securing a drinking vessel). Suitable materials include, but are not limited to, silicone elastomers, nitrile, Viton®, vinyl, neoprene, and polyurethane.

Figure 9:
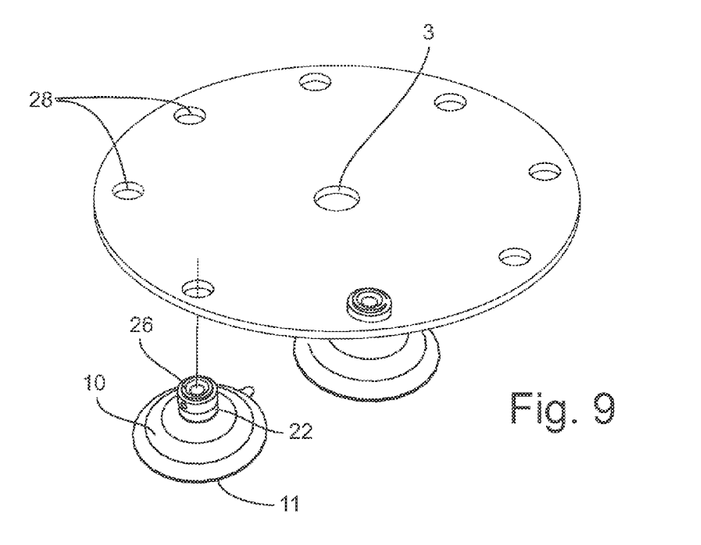
FIG. 9 illustrates an exemplary means for affixing suction cups to a surface.
Figure 16A:
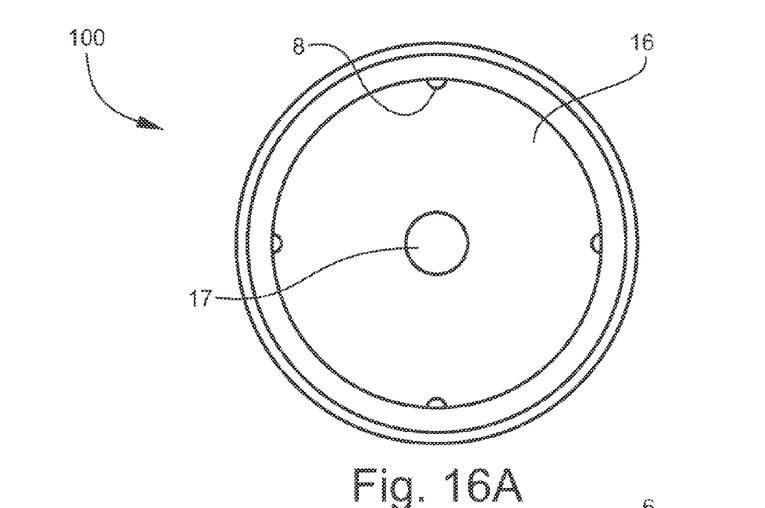
FIG. 16a-b are top and side views of a beverage holder according to an embodiment of the invention.
Figure 16B:
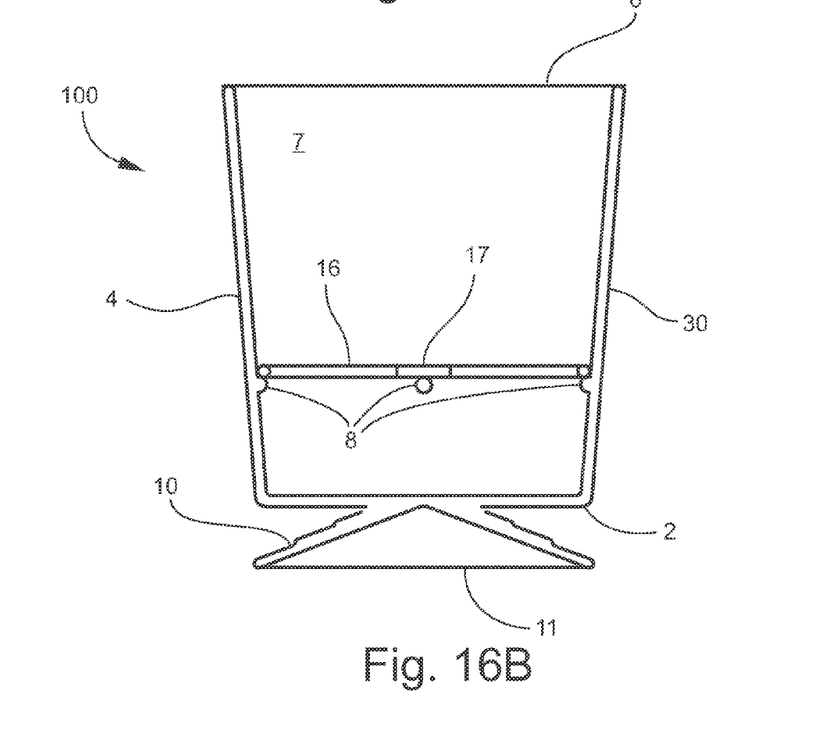

The suction cups 10 can be affixed to the exterior of the beverage holder 100 using a bonding agent or any other suitable fastening means known to one of ordinary skill in the art. In the embodiment shown in FIGS. 8 & 9, the suction cups 10 have a central stem 22 and a head 26 that is inserted into and extends through corresponding bores 28 in the exterior surface of the closed end 2. Alternatively, the suction cups 10 can be integrally formed with the hollow tubular body 30 of the beverage holder 100, as illustrated in FIGS. 16a-b. The integrally formed suction cup 10 and hollow tubular body 30 shown in FIGS. 16a-b can optionally be made of the same material, such as silicone rubber, to facilitate ease of manufacturing and to provide a durable, resilient beverage holder 100.

The sidewall 4 of the hollow tubular body can be sloped to facilitate insertion of drinking vessels 14 of varying widths. Preferably, the sidewall is sloped between one and twenty degrees from a vertical axis. More preferably, the sidewall 4 is sloped between one and ten degrees. In an exemplary embodiment of the beverage holder 100 that is configured to receive children's drinking vessels 14, the sidewall forms a generally cylindrical interior cavity 7 and is sloped between two and six degrees from a vertical axis. This embodiment is approximately eleven centimeters tall as measured from the open end 6 of the hollow tubular body 30 to the bottom of the suction cup 10. The diameter of the interior cavity 7 is approximately eight centimeters at the open end 6 and approximately seven centimeters at the closed end 2. The diameter of the suction cup 10 is about six centimeters at the bottom of the suction cup 10. The thickness of the beverage holder 100 sidewall 4 in this embodiment is approximately four-tenths of a centimeter.

Figure 6:
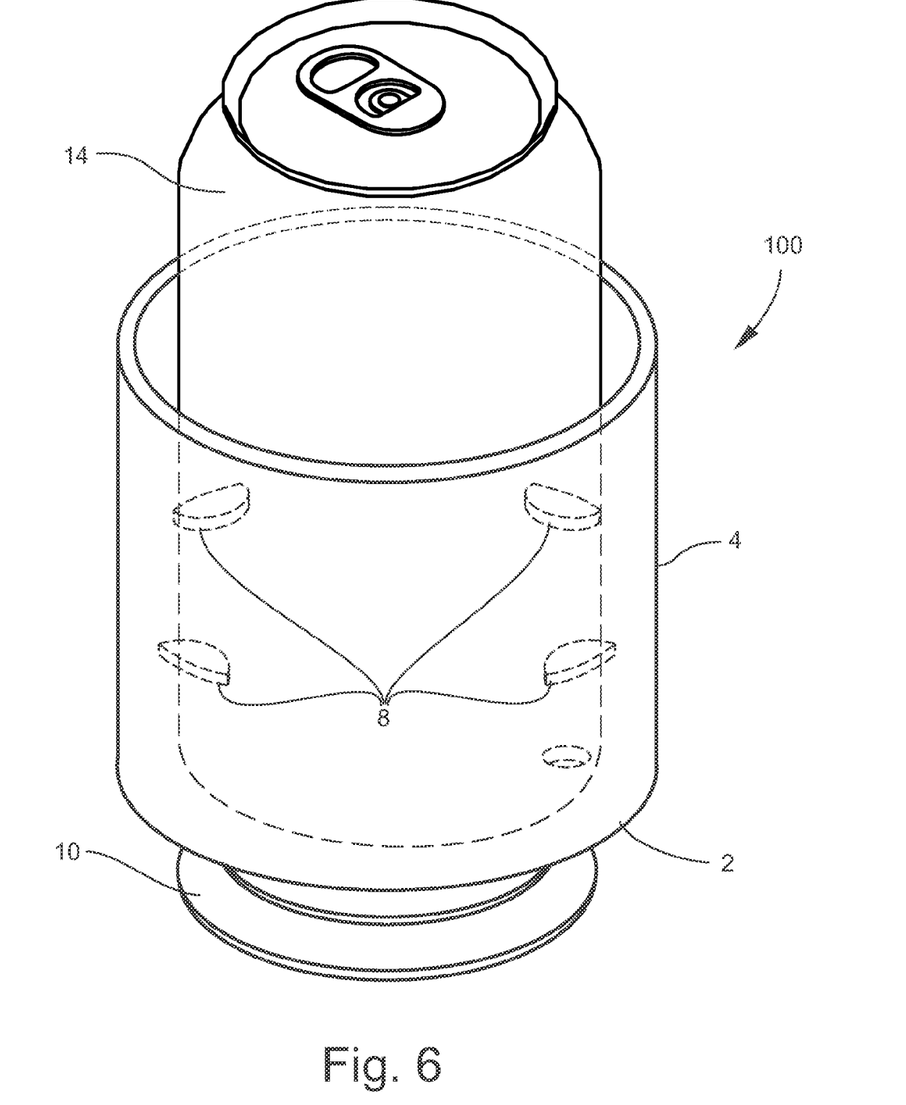
FIG. 6 illustrates operation of the invention without the removable insert installed.
Figure 7:
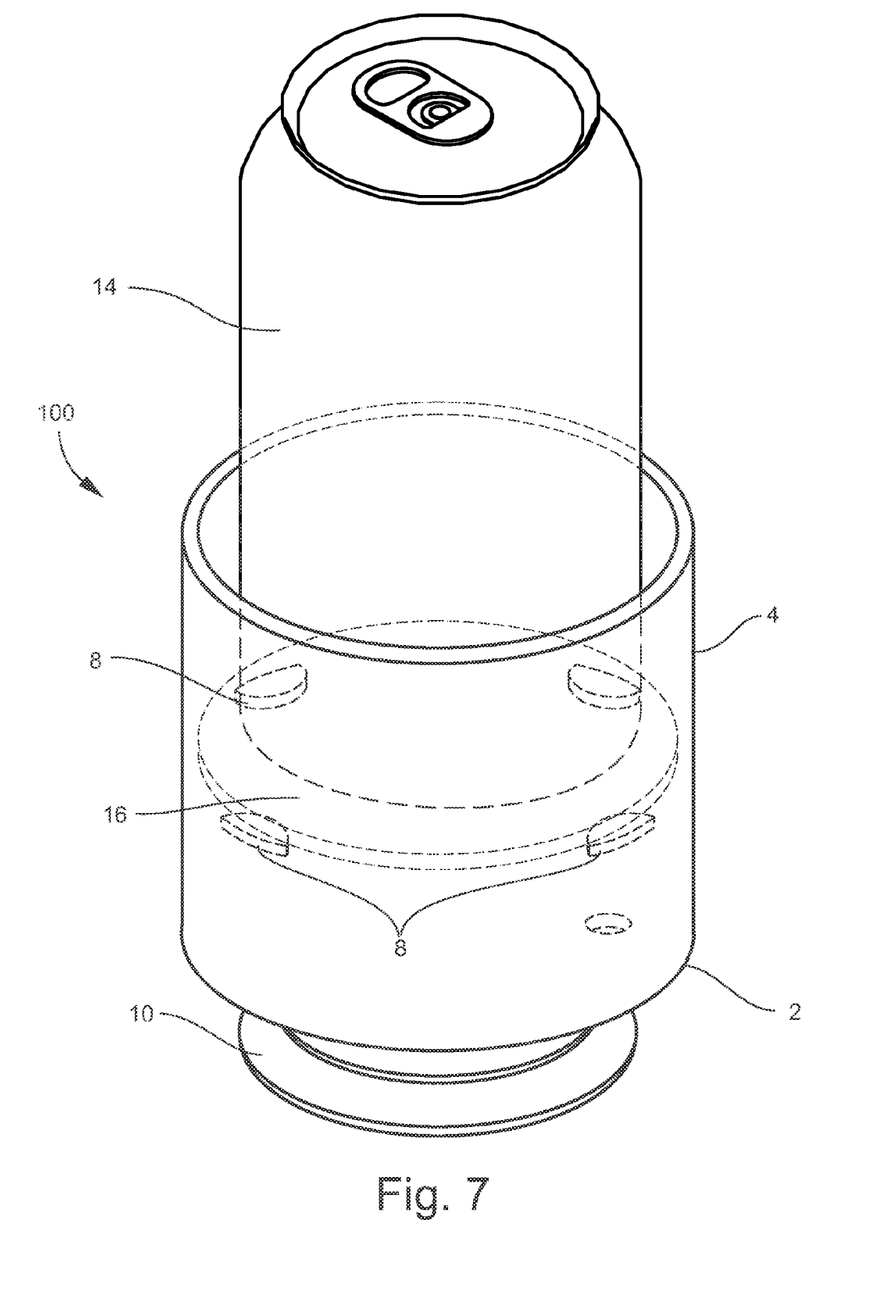
FIG. 7 illustrates operation of the invention with the removable insert installed.
Figure 8A:
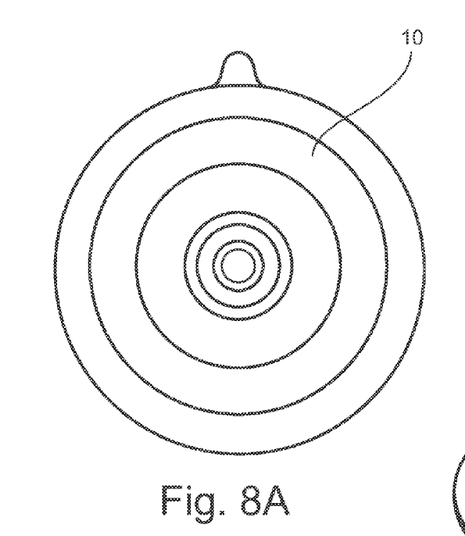
FIGS. 8a-c show top, perspective, and side views an exemplary suction cup.
Figure 8B:
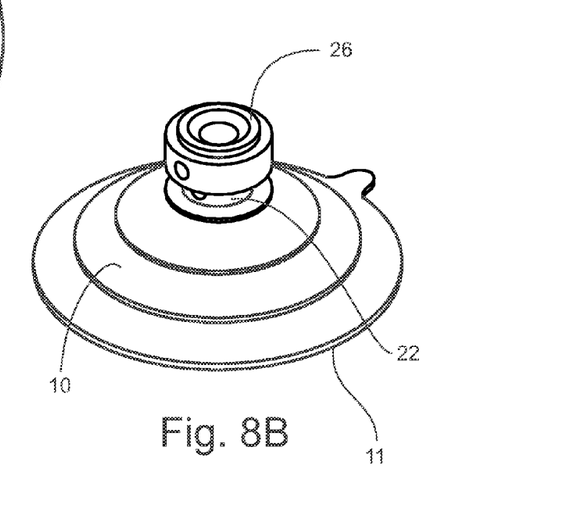
Figure 8C:
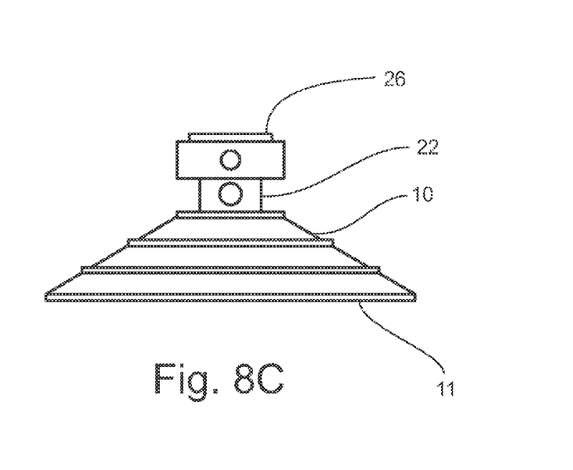

Turning to FIGS. 6-7, a drinking vessel 14 is inserted into the cylindrical cavity 7, and the beverage holder 100 and drinking vessel 14 are placed on a resting surface. The beverage holder 100 is releasably secured to a resting surface by applying downward pressure to the beverage holder 100 and releasing. When downward pressure is applied, the suction cup 10 deforms, and the volume of the space between the suction cup working surface 11 and the resting surface is reduced, which causes fluid between the suction cup 10 and the working surface 11 to be expelled past the rim of the suction cup 10. When the downward pressure is removed, the suction cup 10 tends to resume its original, curved shape. Because most of the fluid has been forced out of the suction cup interior, the cavity that tends to develop between the suction cup 10 and the resting surface contains little to no fluid and, therefore, lacks pressure. The pressure difference between the atmosphere and the low-pressure suction cup interior is what keeps the suction cup 10 secured to the resting surface.

Rather than a suction cup, the exterior surface of the closed end 2 can optionally be covered in whole or in part by a nonslip, frictional surface to secure the beverage holder 100 on a resting surface. The nonslip surface can be formed from any suitable nonslip material, such as rubber, silicone elastomer, vinyl, or neoprene. The nonslip surface can also be formed as textured surface with bumps, groves, protrusions, ridges, serrations, splines, or a combination thereof. In one embodiment, the nonslip surface utilizes synthetic setae made from polymers like polyimide, polypropylene, and polydimethylsiloxane.

Figure 10A:
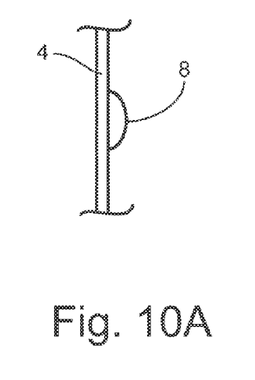
FIG. 10a is an exemplary projection with a semicircular cross section.
Figure 10B:
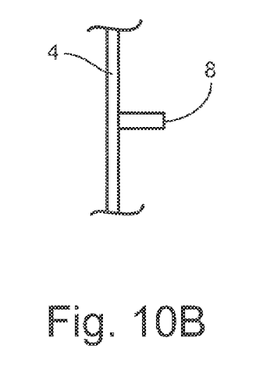
FIG. 10b is an exemplary projection with a rectangular cross section.
Figure 10C:
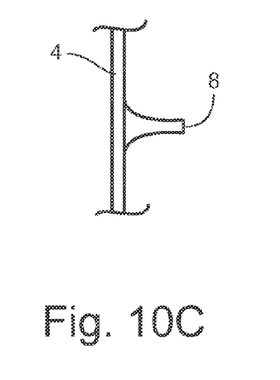
FIG. 10c is an exemplary projection with a fin-shaped cross section.
Figure 11A:
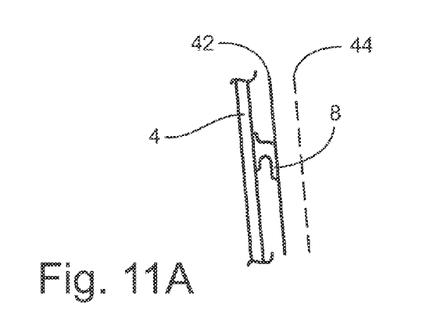
FIGS. 11a-d illustrate deformation of exemplary projections.
Figure 11B:
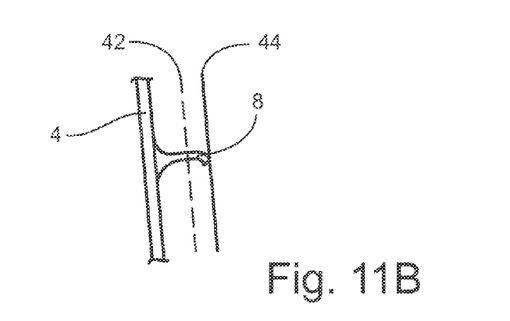
Figure 11C:
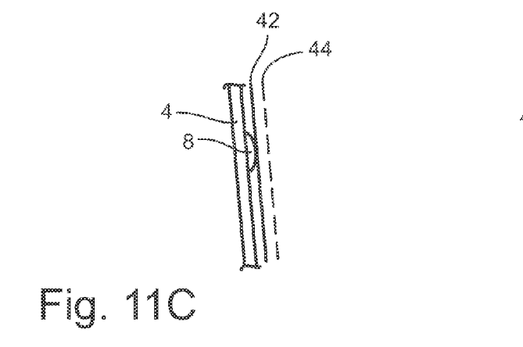
Figure 11D:
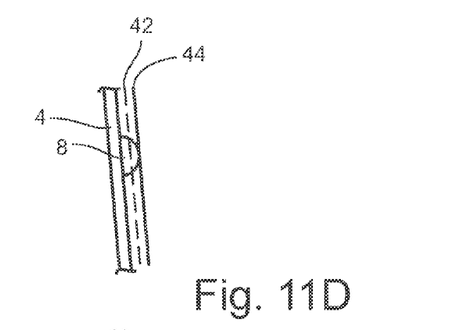

The embodiment shown in FIG. 1 also includes four projections S that are arranged on a surface of the interior cavity 7 and that extend radially inward. The projections 8 shown in FIG. 1 are evenly spaced about a horizontal plane that is transverse to the vertical axis of the hollow tubular body 30. The projections 8 may have any suitable cross-sectional profile, including the semicircular, rectangular, or fin-shaped profiles respectively shown in FIGS. 10*a-c*. The projections 8 can be integrally formed with the hollow tubular body 30 or affixed using a bonding agent or other suitable fastening means. The projections 8 can optionally be formed from a resilient, nonslip material, such as rubber, silicone elastomer, vinyl, or neoprene.

The projections 8 are configured to form a frictional contact with the side surface of a drinking vessel 14. The frictional contact is sufficient to hold the drinking vessel 14 in place yet still allows the vessel 14 to be conveniently removed from the beverage holder 100. In embodiments where the projections 8 are formed from a resilient material, the projections 8 deform as a drinking vessel 14 is inserted into the central cavity 7. The projections 8 can deform to varying degrees to permit the beverage holder 100 to accommodate drinking vessels 14 of different widths, as illustrated in FIGS. 11*a-d*. So, for example, a wider drinking vessel 42 results in a larger deformation of the projection 8 than does a narrower drinking vessel 44. In either case, the projections 8 maintain frictional contact with the side surface 42 & 44 of the drinking vessel 14 to provide a snug fit within the beverage holder 100.

The projections 8 are configured to support a removable insert 16. The removable insert 16 is sized such that it is small enough to fit through the open end 6 and cavity 7 but large enough so that the perimeter of the insert 16 frictionally engages the projections 8 when the insert 16 is placed into the cavity 7. When the removable insert 16 rests horizontally on the projections 8, the contact surface between the perimeter of the removable insert 16 and the projections 8 should be sufficient such that the insert 16 can support a drinking vessel 14 without disengaging the projections 8 and collapsing into the cavity 7. The removable insert 16, therefore, effectively changes the height of the beverage holder 100 so that a drinking vessel 14 inserted into the beverage holder 100 sits higher than it otherwise would without the removable insert 16 in place, as illustrated by FIGS. 6-7.

The embodiment of the insert 16 shown in the attached figures is depicted as a disc, but one of skill in the art will appreciate that the insert 16 can be any suitable shape sufficient to fit through the open end 6 and engage the projections 8, including a planar disc, rectangle, pentagon, hexagon, etc. The insert 16 optionally includes a passage 17 that permits drainage of condensation or excess liquid from the drinking vessel 14 and that facilitates removal of the insert 16.

In some embodiments, drinking vessel 14 can be raised or lowered within the beverage holder 100 by increasing or decreasing the thickness of the removable insert 16 or by using a plurality of inserts 16 stacked on top of each other. Thus, by installing one or more removable inserts 16 or using inserts 16 of varying thicknesses, the beverage holder 100 can accommodate drinking vessels of various heights. This feature is particularly useful as it allows consumers to utilize a single beverage holder 100 for a wide variety of drinking vessels 14 with different heights, such as a standard size aluminum can (approximately 123 mm tall and 66 mm wide), a standard size disposable water bottle (approximately 200 mm tall and 66 mm wide), or a child's drinking cup.

Figure 15A:
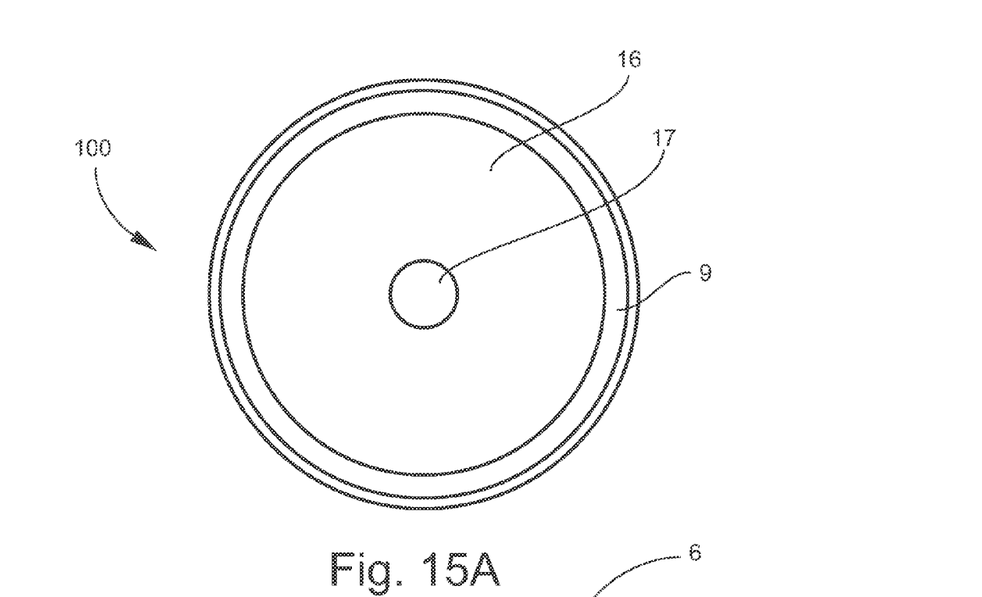
FIGS. 15a-b are top and side views of a beverage holder according to an embodiment of the invention.
Figure 15B:
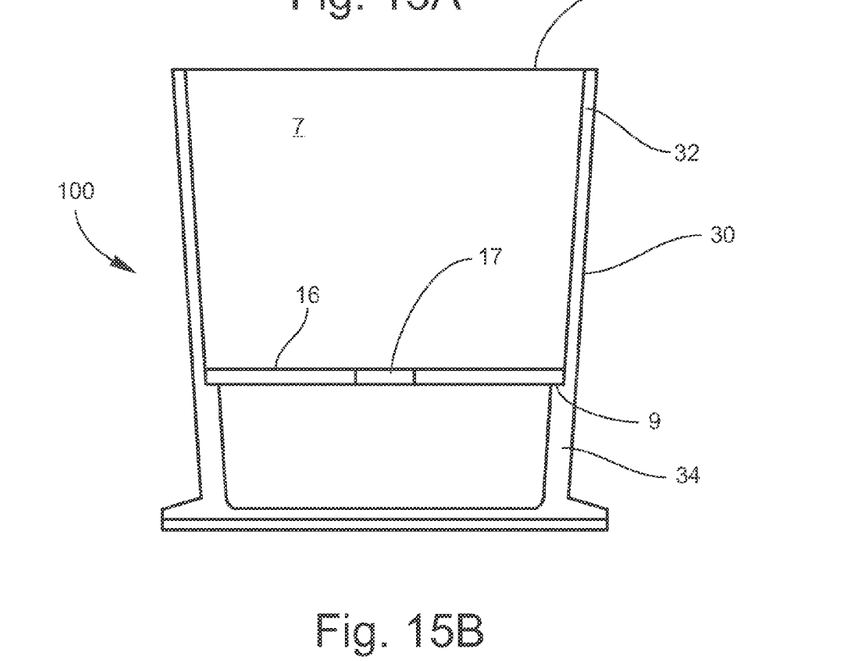

Those of ordinary skill in the art will appreciate that a multitude of other useful configurations for the one or more projections 8 and removable insert 16 are possible. For example, the embodiment shown in FIG. 2 illustrates projections 8 formed as elongated, annular segments that are evenly spaced and circumferentially arranged around the surface of the interior cavity 7. The exemplary beverage holders 100 shown in FIGS. 5-6 illustrate the use of a single, continuous projection 8 that runs circumferentially around the surface of the interior cavity 7. In another embodiment shown in FIGS. 15A-B, the beverage holder 100 is formed with an annular ridge 9 that divides the tubular body 30 sidewall 4 into a thinner upper portion 32 and a thicker lower portion 34. The ridge 9 is configured to frictionally engage and support the removable insert 16.

Figure 12:
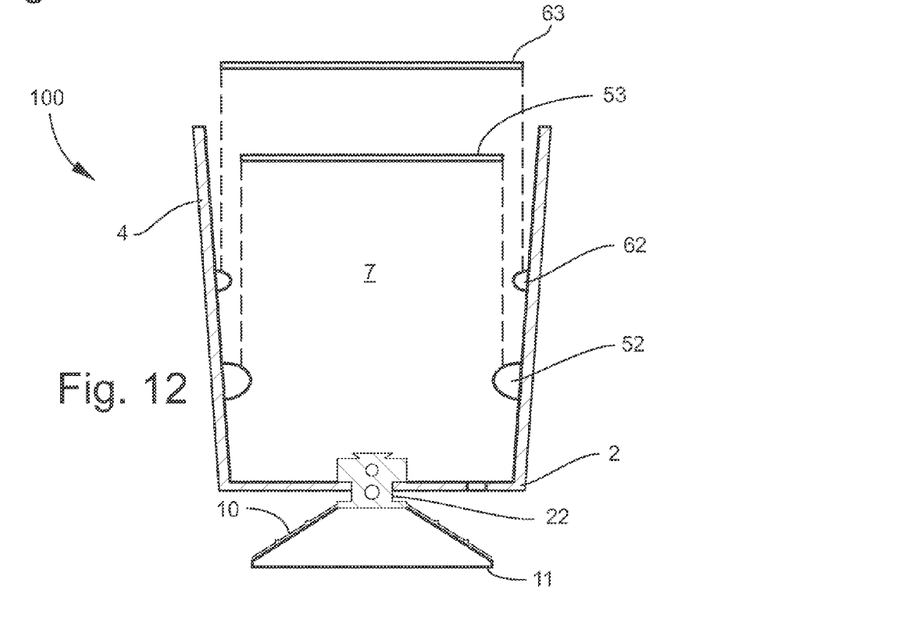
FIG. 12 is an exploded, cutaway, side view according to an embodiment of the invention.

In yet other embodiments, the beverage holder 100 can utilize multiple projections 8 arranged at different vertical heights within the interior cavity 7. Such a configuration is illustrated in FIG. 12 where the lower projections 52 extend further into the cavity 7 than do the upper projections 62. By providing two removable inserts 53 & 63 formed as discs of different diameters, the beverage holder 100 can seat a drinking vessel 14 at three different vertical heights.

The configuration that corresponds to the largest effective tubular body 30 height is the use of the beverage holder 100 without the removable insert 16. The configuration that corresponds to the intermediate tubular body 30 height is the use of the smaller diameter removable insert 53 frictionally engaged with the lower projections 52. The diameter of the smaller removable insert 53 is sized such that the insert 53 can be inserted into the interior cavity 7 without frictionally engaging the upper projections 62, but the diameter is large enough so that the perimeter of the insert 53 frictionally engages the lower projections 52 to provide a support surface for a drinking vessel 14. The configuration that corresponds to the smallest effective tubular body 30 height is the use of the larger diameter removable insert 63 frictionally engaged with the upper projections 62. Skilled artisans will recognize that any suitable number of projection and insert combinations can be used.

Figure 13:
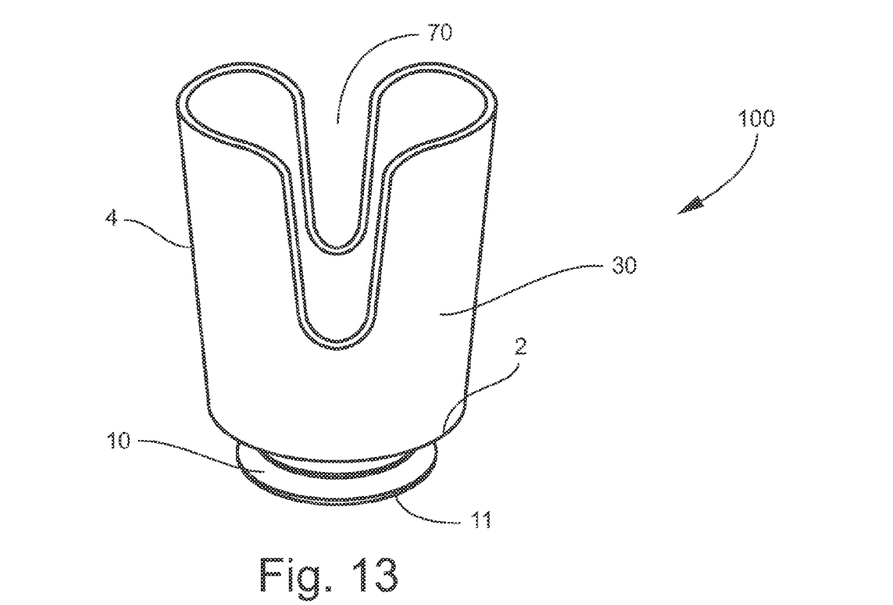
FIG. 13 is a perspective view of one embodiment that includes a notch for receiving a handle.
Figure 14:
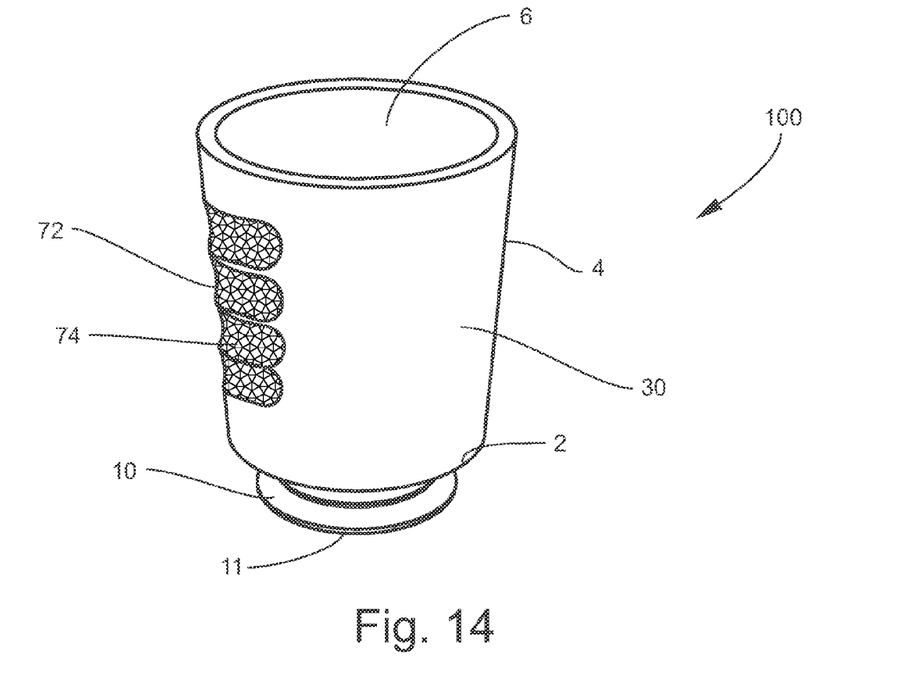
FIG. 14 is a perspective view of one embodiment that includes contours for receiving fingers and a textured gripping surface.

The beverage holder 100 of the present invention can also incorporate other useful features, such as a notch 70 for receiving the handle of a drinking vessel, as depicted in FIG. 13. Yet other embodiments can include grip-enhancing features, such contours 72 on the exterior of the tubular body 30 for receiving fingers, as shown in FIG. 14. The contours 72 or any other exterior surface of the hollow tubular body 30 may optionally include a higher friction portion 74, such as textured surfaces with bumps, groves, protrusions, ridges, serrations, splines, or a combination thereof.

The beverage holder tubular body 30, one or more projections 8, and removable insert 16 can be made of an insulating or noninsulating material. Exemplary insulating materials include, for example, neoprene, polyurethane, polystyrene, PVC, silicone rubber, or combinations thereof.

Alternative embodiments can be formed from various other materials, such as clays, ceramics, glasses, metals, polymers, plastics, rubbers, or combinations thereof.

Components of the beverage holder 100 can be coupled and/or integrated together in any known manner, such as by adhesives or chemical bonds. Further, the beverage holder 100 may be manufactured using any known method, such as by blowing, casting, extruding, forging, machining, molding, stamping, or combinations of such methods. It is further contemplated that the body 30 may be constructed with multiple thin wall configurations (e.g., having two, three, or more sidewalls 4) with voids disposed in between.

Although the foregoing description provides embodiments of the invention by way of example, it is envisioned that other embodiments may perform similar functions and/or achieve similar results. Any and all such equivalent embodiments and examples are within the scope of the present invention.

What is claimed is:

1. A beverage holder comprising:
   a hollow tubular body having a closed end, an open end opposite the closed end, and an axis extending from the open end to the closed end;
   a plurality of projections extending radially inward from an interior surface of the hollow tubular body and configured to contact a sidewall of a drinking vessel residing within the hollow tubular body, wherein
   the plurality of projections have a square cross section and an inner surface that extends along a first arc that is concentric with a second arc formed by the interior surface of the hollow tubular body,
   the plurality of projections are circumferentially arranged on an inner surface of the hollow tubular body on a single plane that is transverse to the axis of the hollow tubular body, and
   the plurality of projections are spaced from the closed end and spaced from the open end a distance that defines a bottom portion of the hollow tubular body and a top portion of the hollow tubular body, wherein the top portion is sized to accommodate a drinking vessel, and
   a removable insert configured to seat within the hollow tubular body against the plurality of projections such that the removable insert is spaced from the closed end and spaced from the open end, wherein the removable insert defines a passage configured to permit fluid flow through the removable insert while the removable insert supports a bottom surface of the drinking vessel.

2. The beverage holder of claim 1, wherein the removable insert is a disc.

3. The beverage holder of claim 1, wherein the disc is planar and aligns transverse to the axis of the hollow tubular body when seated within the hollow tubular body.

4. The beverage holder of claim 1 further comprising a plurality of suction cups arranged periodically along the exterior surface of the closed end.

5. The beverage holder of claim 1, wherein the plurality of projections are a resiliently deformable elastomeric material.

6. The beverage holder of claim 1, wherein the hollow tubular body is made of an insulating material.

7. The beverage holder of claim 1, further comprising a suction cup attached to an exterior surface of the hollow tubular body other than the closed end.

8. The beverage holder of claim 1, wherein the closed end defines an aperture therethrough.

9. The beverage holder of claim 1, wherein the hollow tubular body defines a notch parallel to a longitudinal axis thereof for receiving a handle of a drinking vessel therein.

10. The beverage holder of claim 1, wherein the hollow tubular body comprises a contoured outer surface for facilitating gripping.

11. A beverage holder comprising:
    a hollow tubular body having a closed end, an open end opposite the closed end, a height between the open end and the closed end, and an axis extending from the open end to the closed end;
    at least one projection extending radially inward from an inner surface of the hollow tubular body and configured to contact a sidewall of a drinking vessel residing within the hollow tubular body, wherein
    the at least one projection has a square cross section and an inner surface that extends along a first arc that is concentric with a second arc formed by the interior surface of the hollow tubular body, and
    the at least one projection is spaced from the closed end and spaced from the open end a distance that defines a bottom portion of the hollow tubular body and a top portion of the hollow tubular body, wherein the top portion is sized to accommodate a drinking vessel; and
    a removable insert configured to seat within the hollow tubular body against the at least one projection such that the removable insert is spaced from the closed end and spaced from the open end, wherein the removable insert defines a passage configured to permit fluid flow through the removable insert while the removable insert supports a bottom surface of the drinking vessel.

12. The beverage holder of claim 11, further comprising a suction cup extending from an exterior surface of the closed end.

13. The beverage holder of claim 11, further comprising a nonslip surface at least partially covering an exterior surface of the closed end.

* * * * *